(12) United States Patent
Runde et al.

(10) Patent No.: US 9,517,698 B2
(45) Date of Patent: *Dec. 13, 2016

(54) SYSTEM AND METHOD FOR POWER MANAGEMENT DURING REGENERATION MODE IN HYBRID ELECTRIC VEHICLES

(71) Applicant: Allison Transmission, Inc., Indianapolis, IN (US)

(72) Inventors: Jeffrey K. Runde, Fishers, IN (US); Stephen T. West, New Palestine, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/071,521

(22) Filed: Mar. 16, 2016

(65) Prior Publication Data
US 2016/0193927 A1    Jul. 7, 2016

Related U.S. Application Data (63) Continuation of application No. 14/837,399, filed on Aug. 27, 2015, now Pat. No. 9,296,385, which is a
(Continued)

(51) Int. Cl.
*B60W 20/00* (2016.01)
*B60L 7/10* (2006.01)
(Continued)

(52) U.S. Cl.
CPC . *B60L 7/10* (2013.01); *B60K 6/26* (2013.01); *B60L 3/12* (2013.01); *B60L 15/2009* (2013.01);
(Continued)

(58) Field of Classification Search
CPC ........... B60L 7/10; B60L 15/2009; B60L 3/12; B60K 6/26; Y10S 903/947; B60W 20/14; B60W 40/12; B60W 2400/00; B60W 10/06; B60W 10/08; B60W 10/26; B60W 20/00; B60W 2710/086; B60W 10/18; B60W 30/18127; B60W 2560/105; B60W 2540/10; B60W 2540/12; B60W 2710/08; B60W 2710/18; B60W 20/11; B60Y 2200/92; B60Y 2300/91; B60Y 2300/60
See application file for complete search history.

(56) References Cited

U.S. PATENT DOCUMENTS 7,908,064 B2    3/2011   Cawthorne et al.
2008/0059013 A1  3/2008  Liu et al.
(Continued)

FOREIGN PATENT DOCUMENTS

JP    2009-279988    12/2009

OTHER PUBLICATIONS

International Search Report and Written Opinion issued in PCT/US2014/020513, dated Jun. 18, 2014, 14 pgs.

*Primary Examiner* — Richard Camby
(74) *Attorney, Agent, or Firm* — Woodard, Emhardt, Moriarty, McNett & Henry LLP (57) ABSTRACT

A system and method for recovering the optimum power level during regenerative mode is disclosed. Equations for determining the optimum regenerative power level receivable by an energy storage system, for example for any given deceleration event, are derived and disclosed. The equations consider various losses such as the efficiency of the electric motor generator in the generator mode, wind resistance, rolling resistance, transmission losses, engine losses, and losses in the energy storage system. Also disclosed is at least one embodiment of a procedure for controlling a hybrid drive system to achieve the optimum energy recovery.

35 Claims, 3 Drawing Sheets

Related U.S. Application Data continuation of application No. PCT/US2014/020513, filed on Mar. 5, 2014.

(60) Provisional application No. 61/782,103, filed on Mar. 14, 2013.

(51) Int. Cl.

| | | |
|---|---|---|
| *B60W 10/06* | (2006.01) | |
| *B60W 10/08* | (2006.01) | |
| *B60W 10/26* | (2006.01) | |
| *B60W 10/18* | (2012.01) | |
| *B60W 30/18* | (2012.01) | |
| *B60K 6/26* | (2007.10) | |
| *B60L 3/12* | (2006.01) | |
| *B60L 15/20* | (2006.01) | |
| *B60W 40/12* | (2012.01) | |

(52) U.S. Cl.
CPC .............. *B60W 10/06* (2013.01); *B60W 10/08* (2013.01); *B60W 10/18* (2013.01); *B60W 10/26* (2013.01); *B60W 20/00* (2013.01); *B60W 20/11* (2016.01); *B60W 20/14* (2016.01); *B60W 30/18127* (2013.01); *B60W 40/12* (2013.01); *B60W 2400/00* (2013.01); *B60W 2520/105* (2013.01); *B60W 2540/10* (2013.01); *B60W 2540/12* (2013.01); *B60W 2710/08* (2013.01); *B60W 2710/086* (2013.01); *B60W 2710/18* (2013.01); *B60Y 2200/92* (2013.01); *B60Y 2300/60* (2013.01); *B60Y 2300/64* (2013.01); *B60Y 2300/91* (2013.01); *Y02T 10/6286* (2013.01); *Y10S 903/906* (2013.01); *Y10S 903/93* (2013.01); *Y10S 903/947* (2013.01)

(56) References Cited

U.S. PATENT DOCUMENTS

| | | |
|---|---|---|
| 2011/0169448 A1 | 7/2011 | Ichikawa |
| 2012/0059565 A1 | 3/2012 | Kozarekar et al. |

SYSTEM AND METHOD FOR POWER MANAGEMENT DURING REGENERATION MODE IN HYBRID ELECTRIC VEHICLES

CROSS REFERENCE TO RELATED APPLICATIONS

This application is a continuation of U.S. patent application Ser. No. 14/837,399 filed Aug. 27, 2015, which claims the benefit of International Application No. PCT/US2014/020513 filed Mar. 5, 2014, which claims the benefit of U.S. Provisional Application No. 61/782,103 filed Mar. 14, 2013, the entire disclosures of which are hereby incorporated by reference in their entirety.

BACKGROUND

Hybrid vehicles commonly gather energy during vehicle deceleration which provides a convenient and readily available means for decreasing fuel consumption. Therefore it is useful for hybrid vehicles to determine how best to convert vehicle kinetic energy into electric energy during deceleration. Controlling the electric motor generator to capture too much energy can result in additional high heat losses in the energy storage system. Controlling the electric motor generator to capture too little energy increases total energy lost to parasitic vehicle energy losses. In either case, unnecessary waste is created that might be avoided by determining a closer approximation to the optimum power transfer for a given deceleration event. However, determining the optimum transfer power for a given deceleration event is difficult because it depends on a complex web of interrelated variables and adjusting one variable without carefully considering the effects on the others may result in unintended consequences that could negate the benefits of regenerative energy recovery altogether.

SUMMARY

Disclosed is a system and method for managing power during regeneration mode in a hybrid electric vehicle, for example, during vehicle deceleration. Equations and procedures are considered which consider a nuanced set of parasitic vehicle energy losses caused by the expected changes in kinetic energy resulting from aspects of vehicle energy loss such as wind resistance, rolling resistance, transmission rotational and frictional losses, as well as compression and frictional forces in the engine. Also considered are the resistance and regenerative voltage in the energy storage system, as well as the estimated efficiency of the electric motor generator operating in the generator mode.

These factors are processed in a transmission/hybrid vehicle control module which implements at least one embodiment of the equations disclosed to determine a predicted maximum electrical power the hybrid system can expect to recover at the start of the deceleration event, for example when the user has lifted the accelerator pedal and has not pressed the brake. The transmission/hybrid control module disclosed then signals the electric motor generator or "eMachine" to recover the predicted maximum electrical power level which may be less than the maximum power level it could recover at any given time.

Further forms, objects, features, aspects, benefits, advantages, and embodiments of the present invention will become apparent from the detailed description and drawings provided herewith.

DETAILED DESCRIPTION

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

The reference numerals in the following description have been organized to aid the reader in quickly identifying the drawings where various components are first shown. In particular, the drawing in which an element first appears is typically indicated by the left-most digit(s) in the corresponding reference number. For example, an element identified by a "100" series reference numeral will first appear in FIG. 1, an element identified by a "200" series reference numeral will first appear in FIG. 2, and so on. With reference to the Specification, Abstract, and Claims sections herein, it should be noted that the singular forms "a", "an", "the", and the like include plural referents unless expressly discussed otherwise. As an illustration, references to "a device" or "the device" include one or more of such devices and equivalents thereof.

Figure 1:
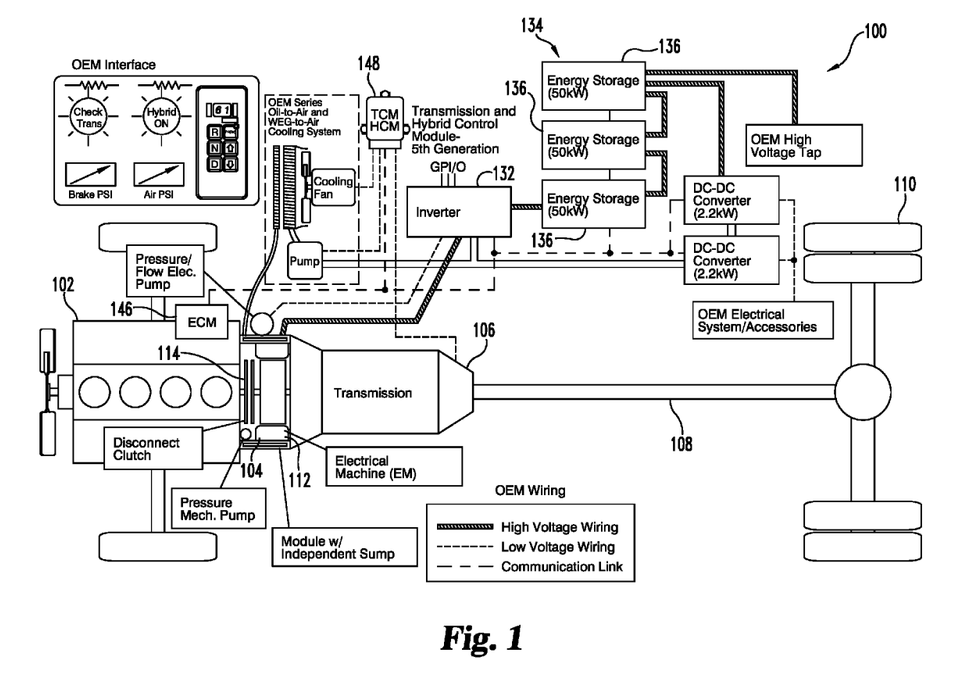
FIG. 1 illustrates a diagrammatic view of one example of a hybrid system.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electric motor generator or electrical machine, commonly referred to as an eMachine 112, and a clutch 114 that operatively connects and disconnects the engine 102 from the eMachine 112 and the transmission 106.

The hybrid system 100 incorporates a number of control systems for controlling the operations of the various components. For example, the engine 102 has an engine control module 146 that controls various operational characteristics of the engine 102 such as fuel injection and the like. A transmission/hybrid control module (TCM/HCM or "the controller") 148 substitutes for a traditional transmission control module and is designed to control both the operation of the transmission 106 as well as the hybrid module 104. The transmission/hybrid control module 148 and the engine control module 146 along with the inverter 132, and energy storage system 134 communicate along a communication link as is depicted in FIG. 1.

In terms of general functionality, the transmission/hybrid control module 148 receives power limits, capacity, available current, voltage, temperature, state of charge, status, and fan speed information from the energy storage system 134 and the various energy storage modules 136 within. In the illustrated example, energy storage system 134 includes three energy storage modules 136 connected together, for example connected together in parallel, to supply high voltage power to the inverter 132. The transmission/hybrid control module 148 in turn sends commands for connecting the various energy storage modules 136 so as to supply voltage to and from the inverter 132. From the inverter 132, the transmission/hybrid control module 148 receives a number of inputs such as the motor/generator torque that is available, the torque limits, the inverter's voltage current and actual torque speed. From the inverter 132, it also receives a high voltage bus power and consumption information. The transmission/hybrid control module 148 also monitors the input voltage and current as well as the output voltage and current. The transmission/hybrid control module 148 also communicates with and receives information from the engine control module 146 and in response controls the torque and speed of the engine 102 via the engine control module 146.

In a typical embodiment, the transmission/hybrid control module 148 and engine control module 146 each comprise a computer having a processor, memory, and input/output connections. Additionally, the inverter 132, energy storage system 134, DC-DC converter system 140, and other vehicle subsystems may also contain computers having similar processors, memory, and input/output connections.

Figure 2:
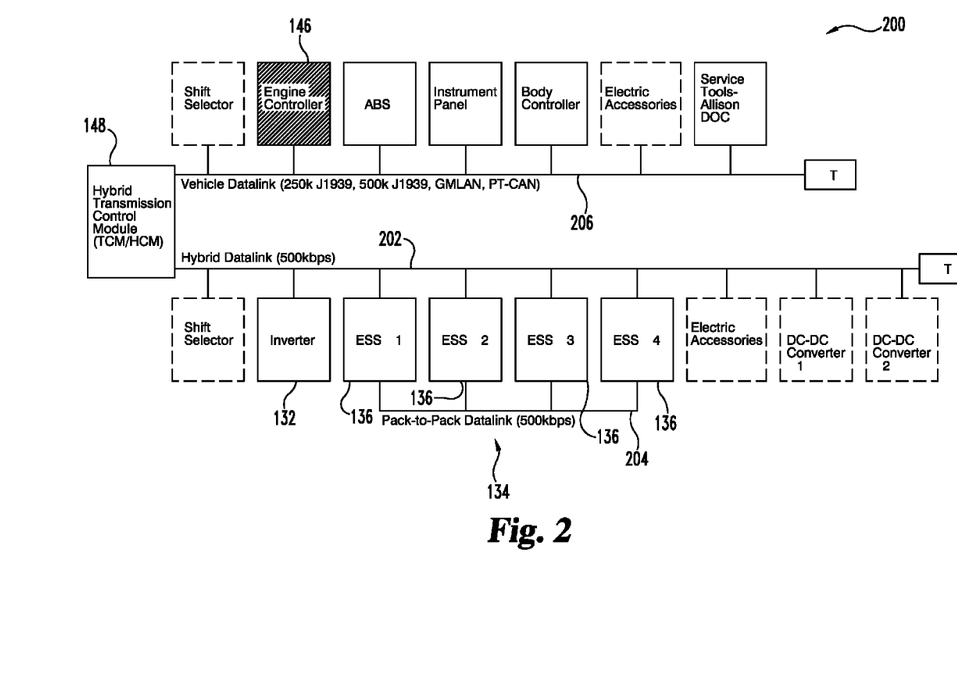
FIG. 2 illustrates a general diagram of an electrical communication system in the hybrid system of FIG. 1.

FIG. 2 shows a diagram of one example of a communication system 200 that can be used in the hybrid system 100. While one example is shown, it should be recognized that the communication system 200 in other embodiments can be configured differently than is shown. The communication system 200 is configured to minimally impact the control and electrical systems of the vehicle. To facilitate retrofitting to existing vehicle designs, the communication system 200 includes a hybrid data link 202 through which most of the various components of the hybrid system 100 communicate. In particular, the hybrid data link 202 facilitates communication between the transmission/hybrid control module 148 and the inverter 132 and the energy storage system 134. Within the energy storage system 134, an energy storage module data link 204 facilitates communication between the various energy storage modules 136. The various components of the hybrid system 100 as well as their function are discussed in further detail in U.S. patent application Ser. No. 13/527,953, filed Jun. 20, 2012 and International Application No. PCT/US/2011/051018, filed Sep. 9, 2011, published as WO 2012/034031 A2, which are hereby incorporated by reference In another aspect, the hybrid system 100 is also configured to control the operation of the eMachine 112 during vehicle deceleration to maximize the total recovered energy by calculating the regenerative power level that maximizes the energy stored in the battery. As a starting point in making these calculations, it should be noted that over a small fixed speed change (i.e. a fixed kinetic energy change), the various energy losses in a hybrid system 100 attributable to deceleration can be considered constant in power and the energy change can be expressed as shown in Equation 1 below:

$$\frac{\Delta E}{\Delta t} = -P_{engine} - P_{transmission} - P_{wind} - P_{rolling} - P_{accessory} - \frac{P_{ESS}}{\text{efficiency}} \quad \text{Equation 1}$$

where $\Delta E$ is the total change in energy over a change in time $\Delta t$, $P_{engine}$ represents one or more engine losses, $P_{transmission}$ represents one or more transmissions losses, $P_{wind}$ represents a loss of energy due to wind resistance acting on the vehicle, $P_{rolling}$ represents a rolling resistance, $P_{accessory}$ is an accessory loss, $P_{ESS}$ is the power recovered in energy storage system 134 during the current regeneration event, and efficiency represents the overall efficiency of eMachine 112 with respect to converting mechanical power to electrical power. The algorithm seeks to determine $P_{ESS}$ such that the recovered energy is maximized for any given regenerative braking event, for instance, for regenerative events involving deceleration alone without friction braking.

Several of the vehicle losses indicated in Equation 1 are caused by an overall predicted change in the vehicle kinetic energy. These losses may also be known at any given time, or at least may be well characterized using accurate approximations in many hybrid vehicle systems. Therefore because they are the result of a predicted change in kinetic energy, these vehicle energy losses can be grouped together for purposes of solving for the optimum power transfer solution, although they may later be considered separately again. For example in one embodiment, $P_{engine}$, $P_{transmission}$, $P_{wind}$, $P_{rolling}$, and $P_{accessory}$, can be determined by hybrid system 100 using various means such as sensors, system lookup tables populated by the manufacturers of various components, or lookup tables populated by hybrid system 100 itself during operation as explained in further detail below. Grouping these vehicle energy losses together results in Equation 2:

$$\frac{\Delta E}{\Delta t} = -P_{Loss} - \frac{P_{ESS}}{\text{efficiency}} \quad \text{Equation 2}$$

where $\Delta E$ is the total change in energy over a change in time $\Delta t$, $P_{Loss}$ represents the sum of $P_{engine}$, $P_{transmission}$, $P_{wind}$, $P_{rolling}$, and $P_{accessory}$ while $P_{ESS}$ remains the power recovered in energy storage system 134, and efficiency represents the efficiency of eMachine 112.

As noted, $P_{ESS}$ represents the total electrical power supplied to energy storage system 134 during the regenerative event. However, some part of the power delivered to energy storage system 134 is lost in the transfer, typically as heat. For example, one embodiment of energy storage system 134 contains one or more battery cells. The high voltage and current passing through the relatively low resistance of the battery cells will result in some heating in the battery cells, perhaps excessive heating if the current is too high. Other energy storage technologies useable in energy storage system 134 may have higher or lower losses in the transfer due to heat or other sources.

Therefore, the total electrical power supplied to energy storage system 134 can be separated into a charge producing component and a loss component as shown in Equation 3a:

$$P_{ESS} = P_{Charge} + P_{Heat} \quad \text{Equation 3a}$$

where $P_{ESS}$ is the total electrical power supplied to energy storage system 134 during the regenerative event, $P_{heat}$ is the predicted electrical power loss, and $P_{charge}$ is the total charge producing component delivered into energy storage system 134 and stored for later use. $P_{heat}$ can be treated as an $I^2R$ loss, thus yielding Equation 3b:

$$P_{heat} = R_{ESS}\left(\frac{P_{ESS}}{V_{regen}}\right)^2 \quad \text{Equation 3b}$$

where $P_{heat}$ is the predicted electrical power loss, $R_{ESS}$ is the resistance of the energy storage system, $P_{ESS}$ is the total electrical power supplied to energy storage system 134 during the regenerative event, and $V_{regen}$ is the voltage supplied to energy storage system 134 from eMachine 112 operating as a generator during the regenerative event.

As asserted above, when the recovered energy is considered over a small fixed speed change (i.e. a fixed kinetic energy change), the recovered energy is equal to the power captured in energy storage system 134 ($P_{charge}$) multiplied by the change in time $\Delta t$ (power being units of energy per unit time and here multiplied by time thus yielding energy). Therefore using Equation 2 to solve for $\Delta t$ and accounting for the change in sign when changing from vehicle energy loss to battery energy gain, the recovered energy is given in Equation 4:

$$P_{charge}\Delta t = \text{Energy Recovered} = \Delta E \frac{P_{charge}}{P_{loss} + \frac{P_{ESS}}{\text{efficiency}}} \quad \text{Equation 4}$$

where $P_{charge}$ is the charge producing component delivered into energy storage system 134 over some time period $\Delta t$, Energy Recovered is the energy recovered in energy storage system 134, $\Delta E$ is the change in energy during the period of time $\Delta t$, $P_{Loss}$ represents the vehicle energy losses, $P_{ESS}$ is the total electrical power supplied to energy storage system 134 during the regenerative event, and efficiency represents the efficiency of eMachine.

Using Equation 2 to express $P_{charge}$ as total battery power less heat losses yields Equation 5:

$$\text{Energy Recovered} = \Delta E \frac{P_{ESS} - R_{ESS}\left(\frac{P_{ESS}}{V_{regen}}\right)^2}{P_{loss} + \frac{P_{ESS}}{\text{efficiency}}} \quad \text{Equation 5}$$

where the terms are as indicated in previous equations above.

To find the optimal energy recovery with respect to power delivered to energy storage system 134, equation 5 is utilized by taking the partial derivative of Energy Recovered with respect to $P_{ESS}$ and solving for zero which gives Equation 6:

$$P_{ESS} = \text{efficiency} * P_{Loss}\left[-1 + \sqrt{1 + \frac{V_{regen}^2}{\text{efficiency} * P_{Loss} * R_{ESS}}}\right] \quad \text{Equation 6}$$

where the terms are as indicated in previous equations above. Equation 6 than represents a mathematical solution taking into consideration a wide range of factors for determining the optimum level of power to regenerate into energy storage system 134 during a regeneration event, for instance during deceleration.

Turning now to operational aspects, hybrid system 100 may implement the equations discussed above to achieve the benefits disclosed. In one embodiment, transmission/hybrid control module 148 has a processor or similar logic circuitry programmed or otherwise designed with circuits capable of performing the actions illustrated in FIG. 3 at 300. Processing begins at 301 by determining first whether a deceleration event is in progress (303). Such a determination can be made, for example, when the operator applies no pressure to the accelerator pedal resulting in a zero input signal being sent to transmission/hybrid control module 148, yet applies no pressure to the brake pedal as well resulting in a second zero input signal being sent to transmission/hybrid control module 148 for the brake pedal as well. The net result then is that the hybrid vehicle is left to coast beginning a deceleration event. In the illustrated embodiment, pressure on either the brake pedal or the accelerator pedal results in a nonzero input signal for either brake or accelerator and is considered by transmission/hybrid control module 148 as an indication that a deceleration event is not occurring (325) causing the logic at 300 to be skipped altogether. However, the formulas disclosed above and logical processing shown at 300 may be adapted to include frictional braking as well.

Figure 3:
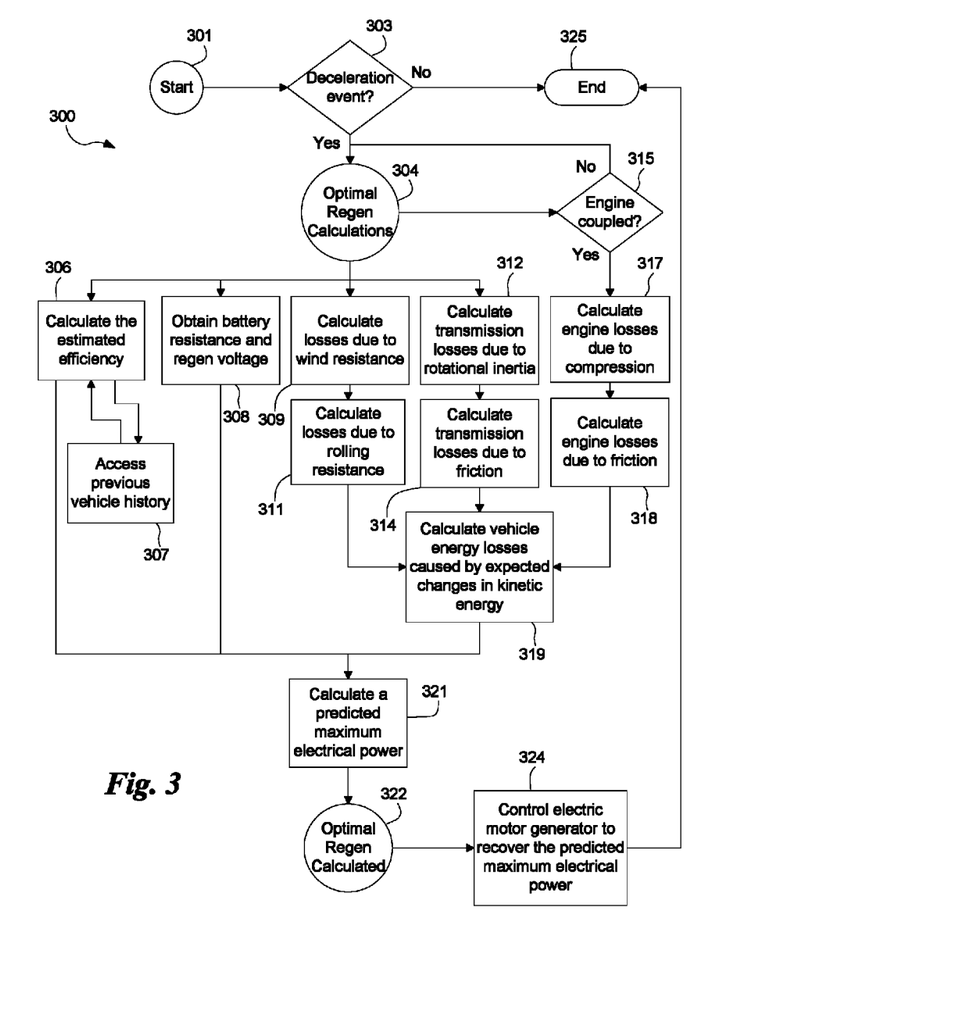
FIG. 3 illustrates one embodiment of a sequence of operations for the hybrid system of FIG. 1 resulting in the optimal power recovery during vehicle deceleration.

However, if a determination is made that a deceleration event is in progress (303), optimal regenerative calculations begin at stage 304. It should be appreciated from FIG. 3 that several execution paths or logical paths diverge from stage 304. This is intended as an example showing that multiple operations may be advantageously programmed to occur simultaneously or asynchronously in the processor or other control circuits within transmission/hybrid control module 148. However, FIG. 3 is exemplary only and not restrictive as it may also be advantageous for the illustrated operations to occur one after the other in a synchronous fashion, or in a different order than the one shown to yield an equivalent result depending on the particular implementation details and design constraints.

In one aspect, the optimal regenerative braking calculations involve determining whether energy will be lost due to friction or compression forces in the engine. Therefore, transmission/hybrid control module 148 determines if engine 102 is coupled to eMachine 112 via disconnect clutch 114 at stage 315. If not, engine related calculations are not processed and processing reverts back to stage 304 with respect to engine calculations. However, if engine 102 is coupled to eMachine 112, then some of the vehicle's kinetic energy that could be recovered as electrical energy will be lost in one or more engine losses. These losses are calculated in stages 317 and 318 where engine losses due to compression forces and frictional forces are accounted for. In one embodiment, these calculations are made by using lookup tables provided by the engine manufacturer. Engine frictional torque are continuously broadcast by engine control module 146 during operation and used to look up estimated engine losses in lookup tables provided by the engine manufacturer.

Transmission/hybrid control module 148 may use a similar technique at stages 312 and 314 to calculate transmission losses due to rotational inertia in transmission 106. Here again, energy consumed or absorbed because of friction or inertia due to moving parts rotating or otherwise moving in the transmission result in energy expended that will not be converted to electrical energy. Transmission manufacturers, like engine manufacturers, provide lookup tables for estimating transmission losses based on the current gear, transmission oil temperature, output shaft speeds and torques in various parts of the transmission, as well as other transmission specific variables. This information is made available to transmission/hybrid control module 148 from transmission 106 and is used to calculate a transmission loss which includes losses due to rotational inertia and friction.

Besides driveline losses, the algorithm also calculates vehicle energy losses resulting from wind resistance (309) and rolling resistance (311). As the vehicle decelerates, for example, from a high-speed, resistance to forward motion caused by the fluid characteristics of the air as the vehicle moves through it results in a reduction in speed that is not translated into recovered electrical energy in energy storage system 134. These losses can, in one embodiment, be calculated according to the formula $P_{wind}=WV^3$ where $P_{wind}$ is the power loss due to wind resistance, W is an aerodynamic or wind coefficient related to the shape and aerodynamics of the vehicle and the relative ease with which it moves through the air, and V is the velocity of the vehicle.

Similarly, losses due to rolling resistance result in the system failing to recover energy into energy storage system 134 because of rolling resistance. Rolling resistance can be calculated by multiplying the mass of the vehicle times the speed of the vehicle times a road resistance coefficient indicating the relative rolling resistance for a given vehicle. The vehicle mass is known to transmission/hybrid control module 148 by various means including information gathered from engine control module 102, transmission 106, and from other processing within transmission/hybrid control module 148 as it processes data to control the hybrid vehicle. Hybrid system 100 may also adaptively estimate and determine the vehicle mass over time which, in some embodiments, is fairly static, for example in the case of a vehicle whose load changes little as a percentage of overall vehicle mass. In other cases, vehicle mass may vary significantly over time, for example in the case of a dump truck shuttling loads to and from a jobsite or a delivery van making multiple deliveries.

When the system has completed calculating individual parasitic vehicle losses, the overall vehicle energy losses can be calculated (319). In the embodiment $P_{Loss}$ shown and described with respect to equations 2, 4, 5, and 6 above, these parasitic vehicle losses are simply added together to form a combined vehicle energy loss that will not be recovered as electrical energy in energy storage system 134. However, in other embodiments, it may be advantageous to apply weighting factors or offsets to give the algorithm the opportunity to adaptively adjust the weighting applied to each element of the overall vehicle energy loss.

Aside from the overall vehicle energy losses calculated in stages 309 through 319, other efficiency related losses are included in the calculation as well. For example, an estimated efficiency is calculated at stage 306 and 307 that is related to the expected electric motor operating efficiency of eMachine 112 shown in equations 1, 2, 4, 5, and 6 as "efficiency" and discussed above as the "estimated efficiency". As eMachine 112 operates in the regenerative braking mode, it exerts a braking force on transmission 106, driveline 108, and the wheels 110 to slow the hybrid vehicle and absorb kinetic energy converting some of the kinetic energy to electrical energy. The rest of the unconverted kinetic energy is lost because of friction, heating, and other parasitic losses in eMachine 112. Stage 306 calculates this estimated efficiency factor and includes it in the calculation as noted in the equations above. One way to consider the estimated efficiency is as a ratio of the generated electrical power divided by the mechanical braking power provided by the drive train in regenerative braking mode. In this embodiment of the estimated efficiency, if all of the available mechanical braking power was converted into electrical power, this ratio would be one, which equates to an efficiency of 100%. However, because some losses in eMachine 112 are virtually inevitable, as with any known electric motor generator, this ratio is some value less than one. Also, because it is an estimate of future performance, it may be advantageous to determine estimated efficiency based on the previous performance of the vehicle over time. Transmission/hybrid control module 148 therefore maintains previous vehicle information, for example in lookup tables based on motor speed and torque from previous regenerative events, to aid in determining the estimated efficiency for the next regenerative event. These lookup tables are accessed (307) in order to calculate the expected electric motor operating efficiency (306) for the current regenerative event.

Besides calculating efficiencies related to eMachine 112, transmission/hybrid control module 148 also obtains battery resistance and regenerative voltage information (308) used in calculating the optimal power transfer that will avoid overly high in energy storage system 134. If excessive heating losses are incurred due to transferring large quantities of power over a short time, the benefits of recovering energy using regenerative braking may be negated due to shortening the life of components within energy storage system 134 such as one or more battery cells within the energy storage modules 136. Similar difficulties may occur with other forms of energy storage such as capacitors and the like which can also be subject to failure if charged to quickly. Therefore, transmission/hybrid control module 148 obtains battery resistance information, for example, from energy storage system 136 and calculates or estimates regenerative voltage using lookup tables which consider factors such as vehicle mass and speed.

Having calculated the estimated efficiency (306), obtained battery resistance and the estimated regenerative voltage (308), and calculated the combined parasitic vehicle energy losses (319), transmission/hybrid control module 148 is ready to calculate the optimal power transfer that may be made to the energy storage system 134 for this particular deceleration event (303). This calculation is made at stage 321 and may include Equation 6 derived and discussed in detail above. When the predicted maximum electrical power calculation is complete (322), transmission/hybrid control module 184 controls eMachine (electric motor generator) 112 to recover the predicted maximum electrical power resulting in a quantity of power entering energy storage system 134 that is substantially equal to the predicted maximum electrical power. Processing then exits (325).

It is worth noting that in the illustrated embodiment, stage 321 operates as a synchronization point meaning that as illustrated, multiple calculations may be ongoing simultaneously. However, in order to calculate a predicted maximum electrical power transfer to energy storage system 134 at stage 321, these calculations must all first complete in order for the necessary values to be available for the final calculation of the predicted maximum electrical power. However, it should be understood that FIG. 3 is only exemplary and that the same result could be achieved by executing stages 304 through 321 sequentially rather than somewhat in parallel as shown, thus achieving the same result though the stages may be executed in a somewhat different order.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

What is claimed is:

1. A method of controlling regenerative braking in a hybrid electric vehicle, comprising:
    calculating a predicted vehicle energy loss for a vehicle using a vehicle controller, wherein the vehicle has an electric motor generator and an energy storage system, and wherein the electric motor generator is electrically connected to the energy storage system;
    calculating an expected electric motor operating efficiency using the vehicle controller;
    calculating a predicted electrical power to supply to the energy storage system using the vehicle controller and the predicted vehicle energy loss; and
    generating a regenerative braking power using the electric motor generator operating as a generator, wherein the regenerative braking power is less than or equal to the predicted electrical power to supply to the energy storage system.

2. The method of claim 1, further comprising detecting a deceleration state of the vehicle.

3. The method of claim 2, wherein the act of detecting a deceleration state includes detecting a torque provided from a transmission to the electric motor generator, wherein the electric motor generator is coupled to the transmission.

4. The method of claim 1, wherein the predicted vehicle energy loss includes losses caused by an expected change in vehicle kinetic energy.

5. The method of claim 1, wherein the predicted electrical power to supply to the energy storage system includes a predicted electrical power loss resulting from an expected transfer of the predicted electrical power to the energy storage system.

6. The method of claim 1, wherein the act of calculating the predicted vehicle energy loss includes calculating an engine energy loss.

7. The method of claim 6, wherein the act of calculating the engine energy loss includes calculating an engine compression force loss.

8. The method of claim 6, wherein the act of calculating the engine energy loss includes calculating an engine frictional force loss.

9. The method of claim 1, wherein the act of calculating the predicted vehicle energy loss includes calculating a wind resistance loss, wherein the wind resistance loss is calculated by the vehicle controller using a vehicle velocity and a vehicle aerodynamic coefficient.

10. The method of claim 1, wherein the act of calculating the predicted vehicle energy loss includes calculating a rolling resistance loss, wherein the rolling resistance loss is calculated by the vehicle controller using a vehicle mass, a vehicle velocity, and a vehicle rolling resistance coefficient.

11. The method of claim 1, wherein the act of calculating the predicted vehicle energy loss includes calculating a vehicle transmission loss.

12. The method of claim 11, wherein the vehicle transmission loss is calculated using a transmission inertia loss and a transmission friction loss.

13. The method of claim 1, wherein the act of calculating the predicted vehicle energy loss includes calculating an accessory loss.

14. The method of claim 1, wherein the act of calculating the expected electric motor operating efficiency includes accessing a previous vehicle activity stored in a memory in the vehicle controller and calculating the expected electric motor operating efficiency based on the previous vehicle activity.

15. The method of claim 1, wherein the act of calculating the expected electric motor operating efficiency is calculated using an electric motor speed and an electric motor torque.

16. The method of claim 5 wherein the predicted electrical power loss can be calculated by the equation:

$$P_{heat} = R_{ESS}\left(\frac{P_{ESS}}{V_{ESS}}\right)^2$$

wherein:
    $P_{heat}$ is the predicted electrical power loss,
    $R_{ESS}$ is a resistance of the energy storage system,
    $P_{ESS}$ is the predicted electrical power to supply to the energy storage system, and
    $V_{ESS}$ is a voltage supplied to the energy storage system.

17. The method of claim 1, wherein the predicted electrical power to supply to the energy storage system can be calculated by the equation:

$$P_{ESS} = \text{efficiency} * P_{Loss}\left[-1 + \sqrt{1 + \frac{V_{regen}^2}{\text{efficiency} * P_{Loss} * R_{ESS}}}\right]$$

wherein:
    $P_{ESS}$ is the predicted electrical power to supply to the energy storage system,
    efficiency is the expected electrical motor operating efficiency,
    $P_{Loss}$ is a power loss resulting from a predicted vehicle kinetic energy change,
    $R_{ESS}$ is a resistance of the energy storage system, and
    $V_{regen}$ is a voltage supplied to the energy storage system from the electric motor generator operating in the generator mode.

18. The method of claim 1, wherein the energy storage system includes one or more battery cells.

19. The method of claim 2, wherein the act of detecting a deceleration event includes detecting a zero input signal on a brake pedal, and a zero input signal on an accelerator pedal.

20. A method of calculating regenerative braking power, comprising:
    calculating a predicted vehicle energy loss using a vehicle controller in a vehicle having a hybrid system that includes an electric motor generator, an internal combustion engine, and an energy storage system, the vehicle controller calculating the predicted vehicle energy loss using a current rate of deceleration of the vehicle;
    calculating a predicted electrical power supplied to the energy storage system using the vehicle controller, the vehicle controller calculating the predicted electrical power using the predicted vehicle energy loss;
    calculating a predicted electrical power loss using the vehicle controller, the vehicle controller calculating the electrical power loss using the predicted electrical power supplied to the energy storage system;

calculating a predicted regenerative braking power using the vehicle controller, the vehicle controller calculating the predicted regenerative braking power using the predicted vehicle energy loss, the predicted electrical power supplied to the energy storage system, and the predicted electrical power loss;

controlling the electric motor generator to generate a regenerative braking power using the controller, the electric motor operating in a generator mode to generate a regenerative braking power that is less than or equal to the predicted regenerative braking power.

21. The method of claim 20, further comprising calculating an expected electric motor operating efficiency using the vehicle controller.

22. The method of claim 21, wherein the act of calculating the expected electric motor operating efficiency includes accessing one or more previous electric motor operating efficiency values stored in a memory in the vehicle controller and using the vehicle controller to calculate the expected electric motor operating efficiency using the one or more previous electric motor operating efficiency values.

23. The method of claim 21, wherein the act of calculating the expected electric motor operating efficiency is calculated by the vehicle controller using an electric motor speed and an electric motor torque.

24. The method claim 20, wherein the act of calculating the predicted electrical power loss includes calculating a predicted change in the temperature of one or more components within the energy storage system.

25. The method claim 20, wherein the act of calculating the predicted vehicle energy loss includes calculating a wind resistance loss, wherein the wind resistance loss is calculated by the vehicle controller using a vehicle speed and a vehicle aerodynamic coefficient.

26. The method claim 20, wherein the act of calculating the vehicle energy loss includes calculating a rolling resistance loss, wherein the rolling resistance loss is calculated by the vehicle controller using a vehicle mass, a vehicle speed, and a vehicle rolling resistance coefficient.

27. The method claim 20, further comprising detecting a deceleration state.

28. The method of claim 27, wherein the act of detecting a deceleration state further comprises using the vehicle controller to detect a torque provided from a transmission to the electric motor generator, wherein the electric motor generator is coupled to the transmission.

29. The method of claim 27, wherein the act of detecting a deceleration state further comprises using the vehicle controller to detect a brake pedal input signal, and an accelerator pedal input signal.

30. The method of claim 20, wherein the act of calculating the predicted vehicle energy loss includes using the controller to calculate an engine energy loss.

31. The method of claim 30, wherein the act of calculating the engine energy loss includes using the vehicle controller to calculate an engine compression force loss.

32. The method of claim 30, wherein the act of calculating the engine energy loss includes using the vehicle controller to calculate an engine frictional force loss.

33. The method of claim 20, wherein the hybrid system includes a transmission coupled to the electric motor generator, and wherein the act of calculating the vehicle energy loss includes using the vehicle controller to calculate a vehicle transmission loss.

34. The method of claim 33, wherein the vehicle transmission loss is calculated by the vehicle controller using a transmission inertia resistance and a transmission friction resistance.

35. A drive system for a hybrid vehicle comprising:
an energy storage system;
a vehicle drive train including an electric motor generator electrically connected to the energy storage system;
a vehicle controller coupled to the energy storage system and the electric motor generator, the vehicle controller having a memory coupled to a processor, the processor configured to:
detect a deceleration state of the hybrid vehicle;
calculate a predicted vehicle kinetic energy change resulting from one or more vehicle energy losses;
calculate a predicted electrical energy loss resulting from an expected transfer of a predicted electrical energy to the energy storage system;
calculate an expected electric motor operating efficiency;
calculate a predicted maximum electrical power deliverable into the energy storage system based on the predicted vehicle kinetic energy change, the predicted electrical energy loss, and the predicted motor operating efficiency; and
operate the electric motor generator in an electric generator mode to generate a generated energy that is substantially equal to the predicted maximum electrical power.

* * * * *